B. B. GILBERT.
BOX COOKING KIT.
APPLICATION FILED OCT. 3, 1918.
1,302,911.
Patented May 6, 1919.
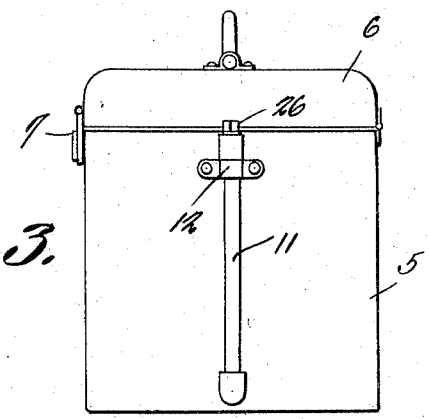
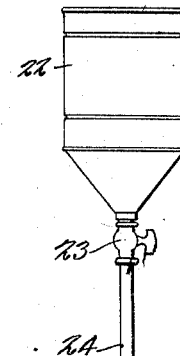
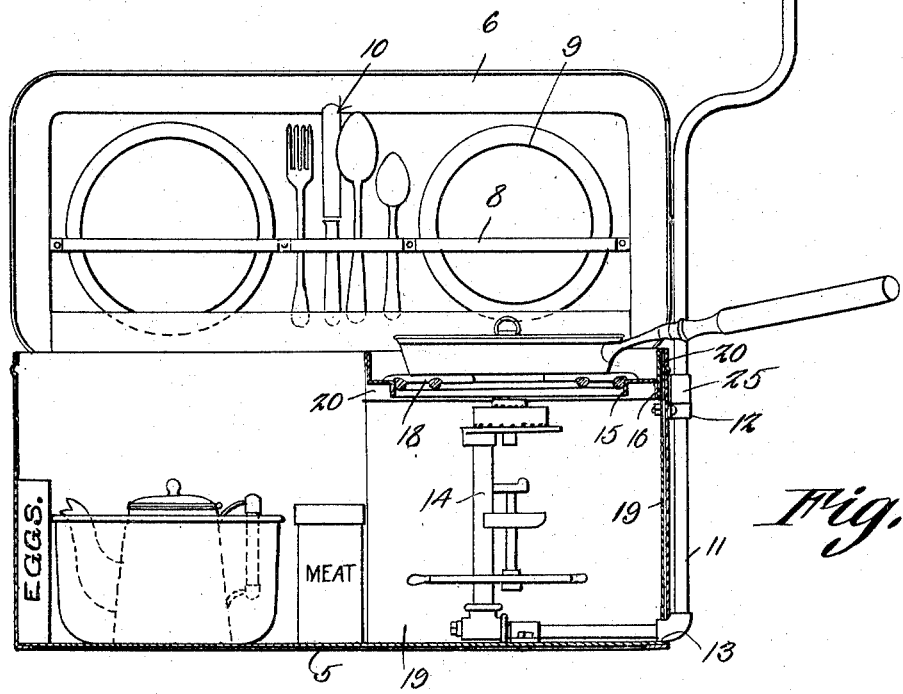
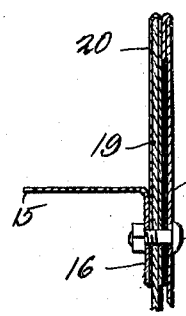

UNITED STATES PATENT OFFICE.

BATTIE B. GILBERT, OF HUNTINGTON, WEST VIRGINIA, ASSIGNOR OF ONE-HALF TO WILLIAM J. FIELDS, OF OLIVE HILL, KENTUCKY.

BOX COOKING KIT.

1,302,911.  Specification of Letters Patent. Patented May 6, 1919.

Application filed October 3, 1918. Serial No. 256,666.

*To all whom it may concern:*

Be it known that I, BATTIE B. GILBERT, a citizen of the United States of America, and resident of Huntington, in the county of Cabell and State of West Virginia, have invented certain new and useful Improvements in Box Cooking Kits, of which the following is a specification.

This invention relates to stoves and particularly to summer or knock down stoves or kits and it has for its object the provision of novel means for supplying the wants or requirements of railway operators who are compelled to make long trips where facilities for the preparation of food are desirable and this is particularly true with respect to conductors and train operators who are working on long runs or trips, the said invention being also of great utility for motorists since the heating medium, culinary articles and table ware can be stored in compactly formed cases which can be secured to the foot board or other part of an automobile so that it may be carried conveniently.

The invention is also desirable for soldiers' use or for picnics, camping parties and other outings.

A further object of this invention is to provide a case with a heater associated therewith, the said heater being so insulated as to prevent damage to the case and the said insulation being protected from fouling which might occur from spattering grease or spilled food, the said invention also having provisions for storing culinary articles as well as table articles so that a complete compact culinary equipment is supplied.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in section of a casing with the lid in elevation and part of the contents of the casing in elevation;

Fig. 2 illustrates an enlarged detail view of the insulation and the protectors and parts associated therewith;

Fig. 3 illustrates an end view of the casing closed.

In these drawings 5 denotes a casing which is preferably a metallic box having a lid 6 hinged thereto and adapted to be held closed by a latch 7 which may be of any appropriate construction, the details of which are not shown.

The inner surface of the lid or cover 6 has retaining strips or elements 8 for holding articles such as plates 9 and other table ware, such as shown at 10, which may comprise knives, forks, spoons or other things.

A fuel feeding tube or pipe 11 is secured to the outside of the casing by a clamp 12 and the said pipe 11 extends through an aperture 13 in the end of the case near the bottom and is coupled to a liquid fuel stove or burner 14 of any appropriate construction, a known construction being illustrated to show its applicability to the casing, but it is to be understood that applicant does not wish to be limited with respect to the type of stove or burner employed.

As shown in the drawing the heating arrangement is stationed as near one end of the casing as practicable so that the remainder of the casing may be utilized for holding pots, pans, kettles or the like as well as the provisions, as illustrated.

In connection with the fuel burner or stove, I provide a top or support for the stove, which top comprises an apertured sheet of metal 15 having a downwardly extending flange 16 at its edge which flange constitutes an anchorage for the fastenings 17 which may comprise bolts, rivets or the like.

A grid or apertured plate 18 is supported in the aperture of the top and is desirable for holding pans, pots or kettles while the contents thereof are being heated or cooked.

To protect the casing from heat, an asbestos lining 19 is applied to the interior wall and the upper edge of the said asbestos lining is provided with a relatively deep binding 20 which embraces the edge of the said asbestos lining and extends down between the flange 16 and the internal wall of the casing so that the binding is clamped in place by the fastenings which project through the flange and casing. The binding is preferably of metal and from the fact that it extends below the upper surface of the apertured plate, grease or food will not reach the insulation but will lodge on the plate and on the binding from whence it can be removed so that the device is sanitary and easily kept clean.

It has been found that a device made in accordance with the foregoing has proven of great utility as it enables the user to have at hand a supply of food and the means for its preparation.

The tank or reservoir 22 has a valve 23 into which a pipe 24 is threaded and the lower end of the pipe 24 is threaded into the coupling 25 at the upper end of the pipe 11, thus making it possible by closing the valve 23 to hold the contents of the reservoir 20, which reservoir may be placed within the casing for transportation along with the pipe 24 which can also be readily removed from the pipe 11 and the valve 23. When the device is in condition for transportation, the upper end of the pipe 11 is closed by a screw threaded plug 26 which will prevent fouling the pipe 11.

I claim

1. A cooking kit comprising a casing adapted to receive a heating device, culinary articles and provisions, a pipe extending through the casing and connected to the heating device, a detachable fuel supplying medium connected to said pipe and adapted to be stored in the casing, an apertured plate, means for supporting the apertured plate above the heating medium, an insulated lining for the casing, a binding embracing the upper edge of the said lining and extending down the sides thereof between the apertured plate and the casing, and means for securing the apertured plate, lining and binding to the casing.

2. A cooking kit comprising a casing adapted to receive a heating device, culinary articles and provisions, a pipe extending through the casing and connected to the heating device, a detachable fuel supplying medium connected to said pipe and adapted to be stored in the casing, an apertured plate having a depending flange at its outer edge, means for supporting the apertured plate above the heating medium, an insulated lining for the casing, a binding embracing the upper edge of the said lining and extending down the sides thereof between the apertured plate and the casing, and fastening means through the said flange, insulation, binding and casing for securing the parts in assembled relation.

B. B. GILBERT.